UNITED STATES PATENT OFFICE.

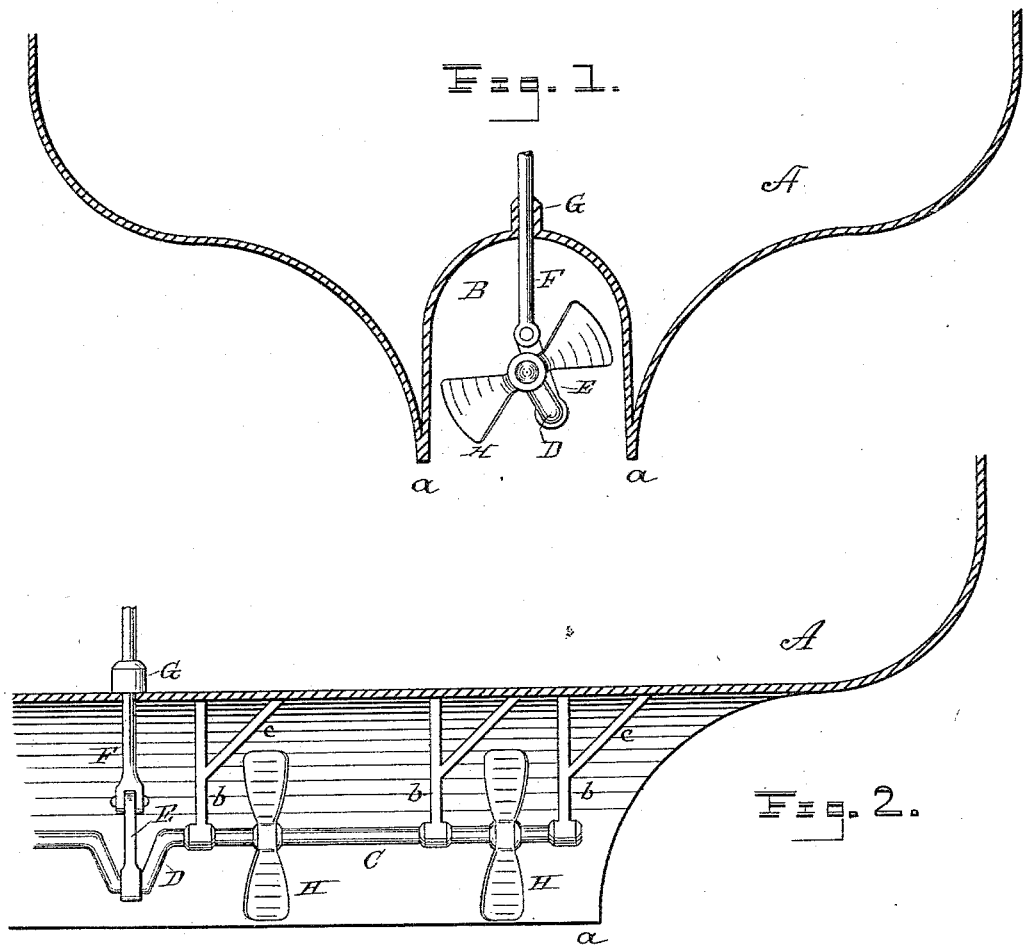

THOMAS J. HANLEN, OF MACON, GEORGIA.

CONSTRUCTION OF SHIPS, &c.

SPECIFICATION forming part of Letters Patent No. 359,861, dated March 22, 1887.

Application filed March 26, 1886. Serial No. 196,665. (No model.)

*To all whom it may concern:*

Be it known that I, THOMAS J. HANLEN, of Macon, in the county of Bibb and State of Georgia, have invented a new and useful Improvement in the Propulsion of Vessels, of which the following is a specification, reference being had to the annexed drawings, forming a part thereof, in which—

Figure 1 is a transverse section of a vessel to which my improvement has been applied. Fig. 2 is a central vertical longitudinal section.

Similar letters of reference indicate corresponding parts in both figures of the drawings.

The hull A of the vessel is provided with two keels, $a\ a$, and with arched plates joining the keels and forming the channel B, which extends longitudinally throughout the entire length of the vessel. The channel B is ∩ shape, and the hull at opposite sides of the channel forms an ogee in cross section, as shown in Fig. 1, thus forming two narrow keels, $a\ a$. By thus shaping the hull the vessel will draw very little water, as compared with a vessel having the hull rounded on a gradual curve from the keel outward and upward. Such a vessel has had a channel in which the propeller was mounted.

In the channel B is supported the screw-shaft C upon hangers $b$, suspended from the top of the channel and stiffened by braces $c$. The shaft C is provided with the usual crank, D, which is connected by the connecting-rod E with the piston-rod F of the propelling-engine. The piston-rod F extends upward through a guide and stuffing-box, G, in the top of the tunnel into the cylinder, and is connected with a piston, which is operated in the usual way.

Upon the shaft C are secured two propeller-screws, H, which may be arranged parallel with each other, or at right angles with each other, as may be desired. The screws H are preferably two bladed, and have a diameter approximating that of the channel B, in which they are located. The water surrounding the screws is confined by the channel, so that it is acted upon more positively than it would be if the screws were working in an unconfined space, and as a consequence smaller screws are enabled to produce results equal to those secured by the employment of large screws.

Having thus described my invention, what I claim as new, and desire to secure by Letters Patent, is—

A vessel provided with a ∩-shaped longitudinal channel through its hull, the sides of the hull being of ogee form in cross-section, and connecting at their lower portions, respectively, with the outer lower edges of the channel to form double keels, as and for the purpose set forth.

THOMAS J. HANLEN.

Witnesses:
 JOHN W. O'HARA,
 W. H. FREEMAN.